US009479336B2

(12) United States Patent
Smelyansky

(10) Patent No.: US 9,479,336 B2
(45) Date of Patent: Oct. 25, 2016

(54) GENERALIZED METHOD FOR AUTHENTICATING SUBSCRIBERS OF A SERVICE VIA A GRAPHICAL USER INTERFACE OR TELEPHONE USING THE SAME USER NAME AND PASSWORD

(75) Inventor: Vladimir Smelyansky, Glenview, IL (US)

(73) Assignee: XCAST LABS, INC., Northfield, IL (US)

( * ) Notice: Subject to any disclaimer, the term of this patent is extended or adjusted under 35 U.S.C. 154(b) by 59 days.

(21) Appl. No.: 12/710,160

(22) Filed: Feb. 22, 2010

(65) Prior Publication Data

US 2010/0218244 A1 Aug. 26, 2010

Related U.S. Application Data

(60) Provisional application No. 61/154,480, filed on Feb. 23, 2009.

(51) Int. Cl.
*H04L 29/06* (2006.01)
*H04L 9/32* (2006.01)
*G06F 21/31* (2013.01)
*G06F 7/04* (2006.01)
*G06F 15/16* (2006.01)
*G06F 17/30* (2006.01)

(52) U.S. Cl.
CPC ............. *H04L 9/3247* (2013.01); *G06F 21/31* (2013.01); *H04L 9/3226* (2013.01); *H04L 63/0428* (2013.01); *H04L 63/083* (2013.01); *H04L 2209/80* (2013.01)

(58) Field of Classification Search
None
See application file for complete search history.

(56) References Cited

U.S. PATENT DOCUMENTS

| 7,562,227 B1* | 7/2009 | Cox .................. G06F 21/36 713/183 |
| 2003/0140258 A1* | 7/2003 | Nelson et al. ............. 713/202 |
| 2004/0091089 A1* | 5/2004 | Wynn .................. 379/93.05 |
| 2005/0043023 A1* | 2/2005 | Romeo .................. 455/423 |
| 2007/0186017 A1* | 8/2007 | Wormald ........... G06F 3/0233 710/67 |
| 2007/0254648 A1 | 11/2007 | Zhang et al. |
| 2008/0111711 A1* | 5/2008 | Scott .................. G06F 3/0236 341/23 |
| 2008/0134307 A1* | 6/2008 | Ashkenazi et al. ........... 726/6 |
| 2009/0106827 A1* | 4/2009 | Cerruti et al. ............... 726/7 |
| 2009/0278803 A1* | 11/2009 | Nejat ...................... 345/168 |

OTHER PUBLICATIONS

International Search Report issued in PCT/US2010/025077, dated Apr. 22, 2010.

* cited by examiner

*Primary Examiner* — Shin-Hon Chen
(74) *Attorney, Agent, or Firm* — Smith, Gambrell & Russell, LLP

(57) ABSTRACT

A method and system for authenticating a subscriber of a user using a graphical user interface or telephone using the same user name and password is provided. As a result, subscribers need to memorize only one user name and/or password, saving precious time and energy to the subscriber because of the low risk of forgetting the user name and/or password. In addition, with the advent of cross-category products such as web phones (Web user interface integrated in a telephone) and soft phone (software on a personal computer reproducing the function of a telephone), it can become confusing for subscribers to remember which passwords and user name to use for which device. Having one password and one user name to remember makes the situation simpler.

6 Claims, 5 Drawing Sheets

GENERALIZED METHOD FOR AUTHENTICATING SUBSCRIBERS OF A SERVICE VIA A GRAPHICAL USER INTERFACE OR TELEPHONE USING THE SAME USER NAME AND PASSWORD

CROSS-REFERENCE TO RELATED APPLICATIONS

This application claims the benefit of Provisional Application No. 61/154,480, filed Feb. 23, 2009, the contents of which are incorporated herein in their entirety.

BACKGROUND OF THE INVENTION

1. Field of the Invention

The present invention relates to a method and system for authenticating a subscriber of a service using a graphical user interface or telephone using the same user name and password.

2. Description of the Related Art

A large number of services such as banking, unified communications, legal, or investing services require subscribers of the services to enter a user name (also called user ID) and/or a password to access said services. This process is called authentication. Typically, entry of the user name and/or password is performed using a graphical user interface of a client device, such as a PC application, a web, a PDA or a cell phone with web capabilities. Often, subscribers of these services can also access said services via a telephone and the Public Switched Telephone Network (PSTN). In that case, subscribers enter their user name, which could be the phone number, and password using the telephone keyboard.

In most cases, during the registration process, the subscriber of a service is required to select a user name and/or password having at least a certain number of digits. Because telephone keyboards have a smaller number of keys than a system with a graphical user interface the choice is limited to digits only here, when in case of GUI system it is a combination of alpha-numeric characters. In some cases, it even may include special characters for additional security. Accordingly, the password used with a telephone and a client device are often different. There is a need to use the same password and user name for both the telephone keyboard and the graphical user interface.

SUMMARY OF THE INVENTION

A method and system for authenticating a subscriber of a service using a graphical user interface or telephone using the same user name and password is provided. As a result, subscribers need to memorize only one password, saving precious time and energy to the subscriber because of the low risk of forgetting the password. In addition, with the advent of cross-category products such as web phones (Web user interface integrated in a telephone) and soft phone (software on a personal computer reproducing the function of a telephone), it can become confusing for subscribers to remember which passwords and user name to use for which device. Even more, accessing the same services from the smart phone by making PSTN phone calls requires different password from accessing the same service from the same phone over Internet. Having one password and one user name to remember makes the situation simpler.

According to an embodiment of the invention a computer-implemented method of authenticating a subscriber of a service using a graphical user interface or telephone using the same user name and password includes receiving a password from a client device for a subscriber and determining whether the password was entered using a telephone keyboard or a graphical user interface. When the password is entered using a telephone keyboard, a record for the subscriber is accessed and compared with the password in the field of the record storing the telephone password for the subscriber. When the password is entered using a graphical user interface, the record for the subscriber is accessed and the entered password is compared with the field in the record storing the graphical user interface password for the subscriber. The subscriber is notified of whether the password has been accepted.

According to an embodiment of the invention, a server for authenticating a subscriber of a service using a graphical user interface or telephone using the same password includes a processor operable to execute computer program instructions, a memory operable to store computer program instructions executable by the processor, and computer program instructions stored in the memory and executable to perform the above-described method.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

A method and system for authenticating a subscriber of a user using a graphical user interface or telephone using the same user name and password is provided. As a result, subscribers need to memorize only one password, saving precious time and energy to the subscriber because of the low risk of forgetting the password. In addition, with the advent of cross-category products such as web phones (Web user interface integrated in a telephone) and soft phone (software on a personal computer reproducing the function of a telephone), it can become confusing for subscribers to remember which passwords and user name to use for which device. Having one password and one user name to remember makes the situation simpler.

Figure 1:
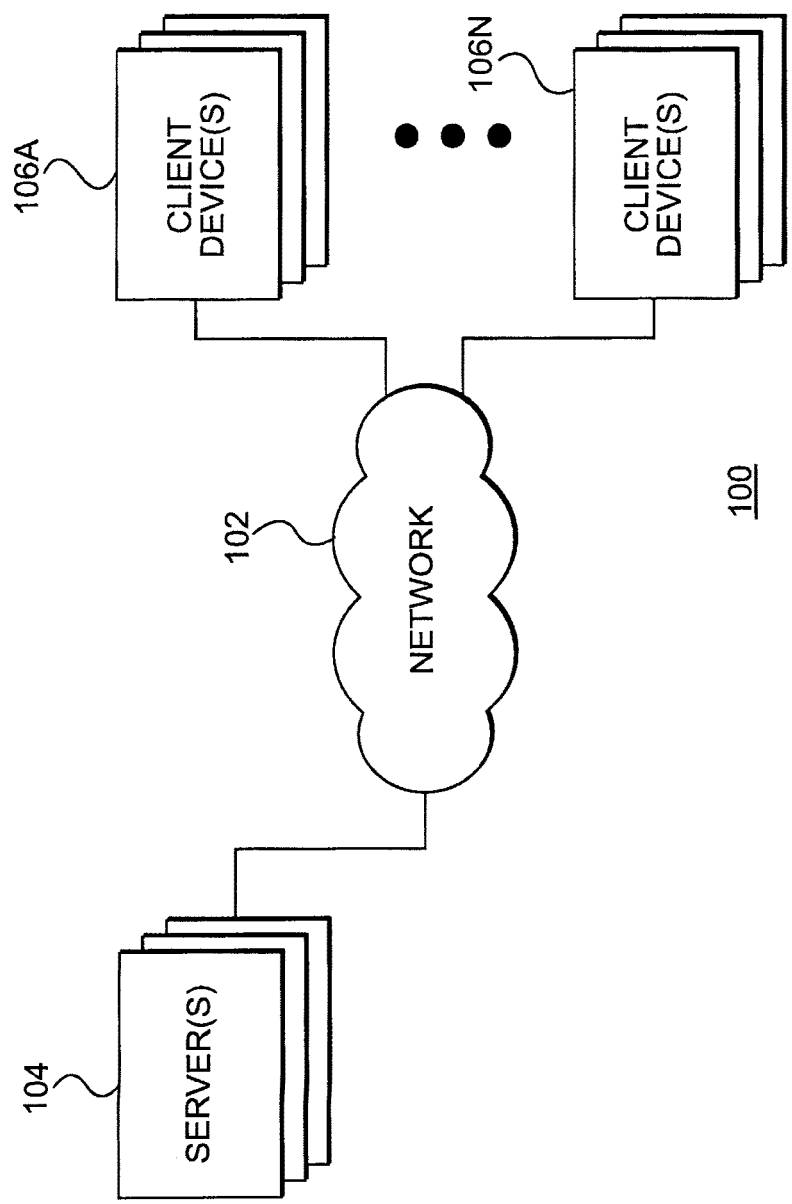
FIG. 1 is an exemplary diagram of block diagram of a network system in which the present invention may be implemented according to an embodiment of the invention.

As an example, such features may be provided in a network system 100 such as that shown in FIG. 1. FIG. 1 shows a network 102, one or more Servers 104, and a plurality of client devices 106A-N. Network 102 includes any communications network that is now in service or which may be developed in the future. Such a network may include one or more public or private communications networks, such as the Internet, wired or wireless telephone networks, wired or wireless data networks, local area networks, etc. Servers 104 are servers that provide access to various kinds of services, such as banking, unified communications, legal, entertainment, or investing services. Servers 104 may also provide any type of media resource, such as audio, video, images, faxes, conferences, etc. Server 104 is also used to establish and authenticate (where necessary) connections by which services are provided to client devices 106A-N. Client devices 108A-N are any type of device that requests access to media and receives/transmits the requested media streams. Such devices may include personal computers, Web-enabled televisions, mobile telephones and PDAs, and the like.

Figure 2:
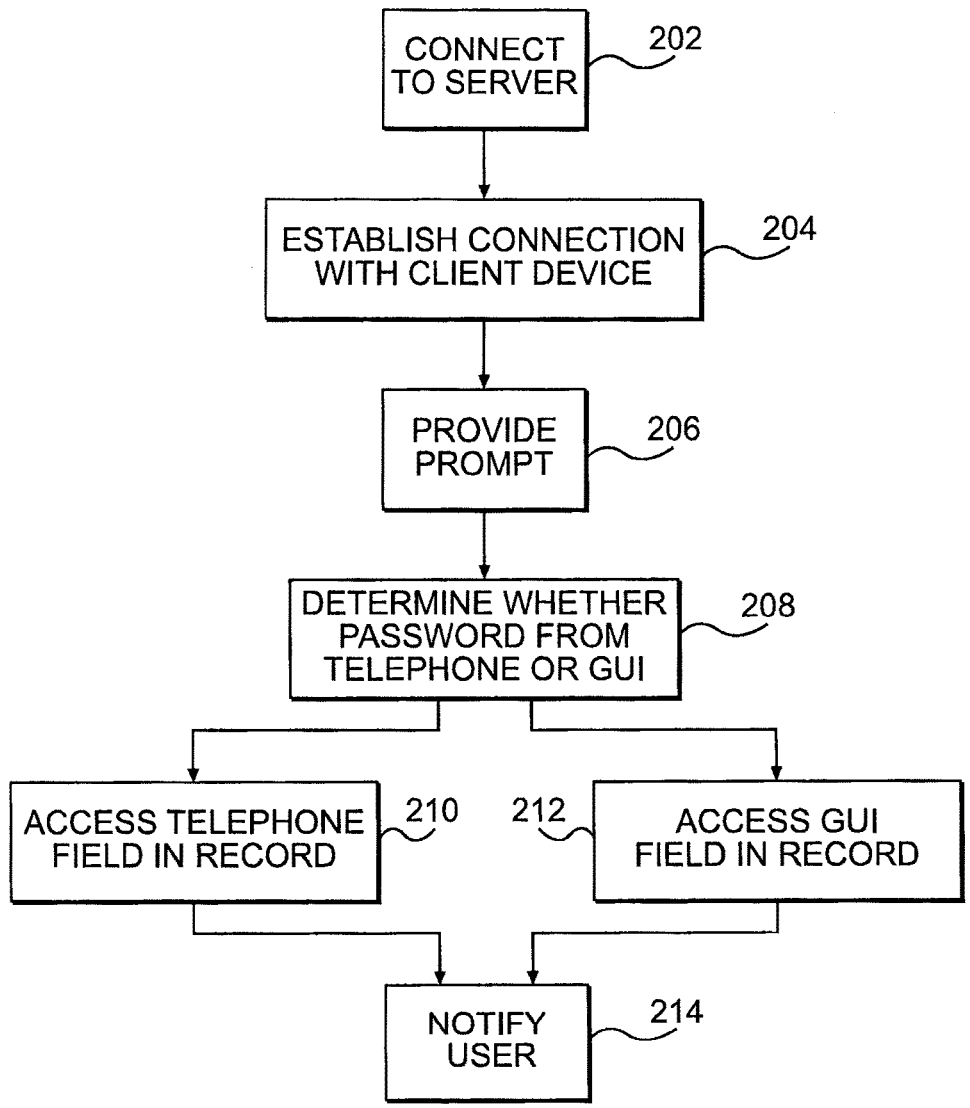
FIG. 2 is an exemplary flow diagram of a process of authenticating a subscriber of a service using a graphical user interface or telephone using the same user name and password according to an embodiment of the invention.
Figure 3:
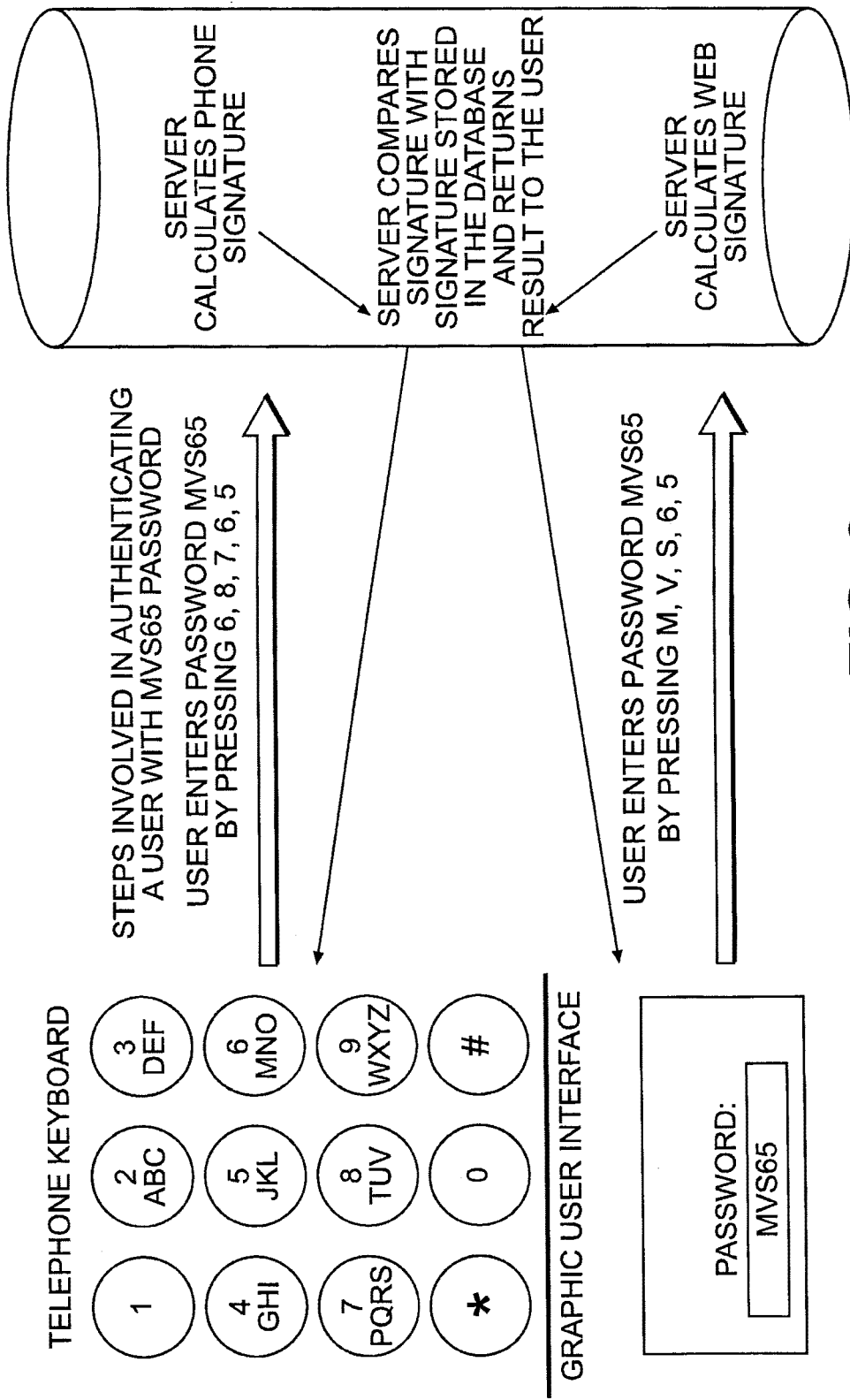
FIG. 3 is an exemplary diagram of entering a registered password for access to services on Servers 104 according to an embodiment of the invention.

An exemplary flow diagram of a process 200 of authenticating a subscriber of a service using a graphical user interface or telephone using the same user name and password is provided is shown in FIG. 2. It is best viewed in conjunction with FIG. 3, which is an exemplary diagram of entering a registered password for access to services on Servers 104 using either a telephone keyboard or a graphical user interface. Process 200 begins with step 202, in which a calling client device 106A connects to a Server 104. In step 204, Server 104 establishes a connection with calling subscriber client device 106A. In step 206, the subscriber is prompted to enter their registered user name and/or password for the service provided by the Server 104. In the case of a telephone, the subscriber would enter their user name first, if required, and then their password using the integers on the telephone keyboard, where most integers on the telephone keyboard bear letters according to the system as shown in FIG. 3. For, example the subscriber's user name "John" would be entered when prompted by the Server 104 using the telephone keyboard and pressing the integers 5, 6, 4, 6, where each integer bears a letter of the user name. Likewise, the password "MVS65" of the subscriber would be entered when prompted by the Server 104 using the telephone keyboard and pressing the integers 6, 8, 7, 6, 5. In the case of a graphical user interface, the subscriber's user name "John" would be entered using the graphical user interface and typing the letters J, o, h, n and the password "MVS65" would be entered by typing the letters M, V, S, 6, 5. In an embodiment of the invention, the user name and/or password are encrypted. The password can be encrypted with MD5, UNIX encrypt or something else. There are many good tools available for it. In step 208, Server 104 determines whether the user name and/or password was entered using a telephone keyboard or a graphical user interface. It is known from the way that connection was established, for example over the Web server or over PSTN channel. If the user name and/or password was entered using a telephone keyboard, the process proceeds to step 210, where Server 104 accesses a record for the subscriber having the user name and compares the entered password with the password in the field of the record storing the telephone password for the subscriber. If the password was entered using a graphical user interface, the process proceeds to step 212, where Server 104 accesses the record for the subscriber having the user name and compares the entered password with the field of the record storing the graphical user interface password for the subscriber. In step, 214 the Server 104 informs the subscriber of whether the authentication succeeded or failed.

Figure 4:
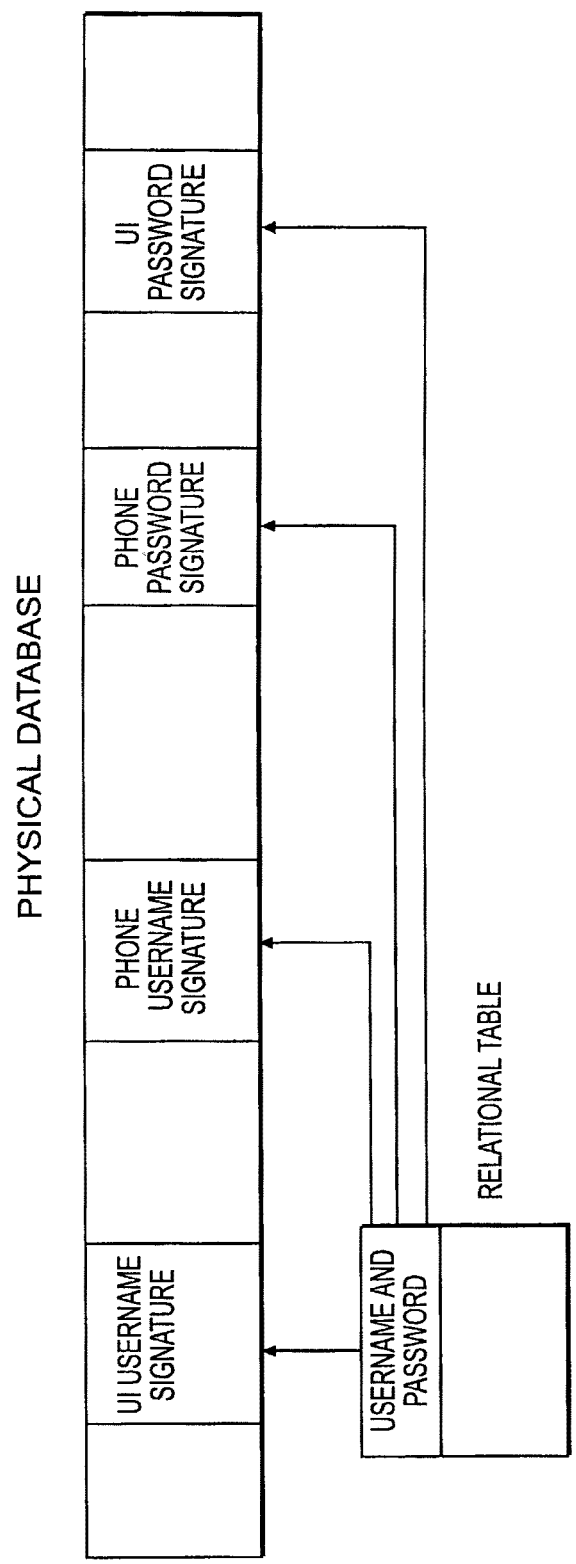
FIG. 4 is an exemplary diagram of a relational database according to an embodiment of the present invention.

An exemplary diagram of a relational database according to an embodiment of the present invention is shown in FIG. 4. According to the embodiment of FIG. 4, user names and/or passwords originating from either the phone or user interface are resolved by having ALL entries in a relational table for each subscriber. In the case of an Object Oriented Database Management System, all entries including, but not limited to, user name, password, UI user name signature, phone user name signature, UI password signature, and phone password signature would be included in a single record.

Figure 5:
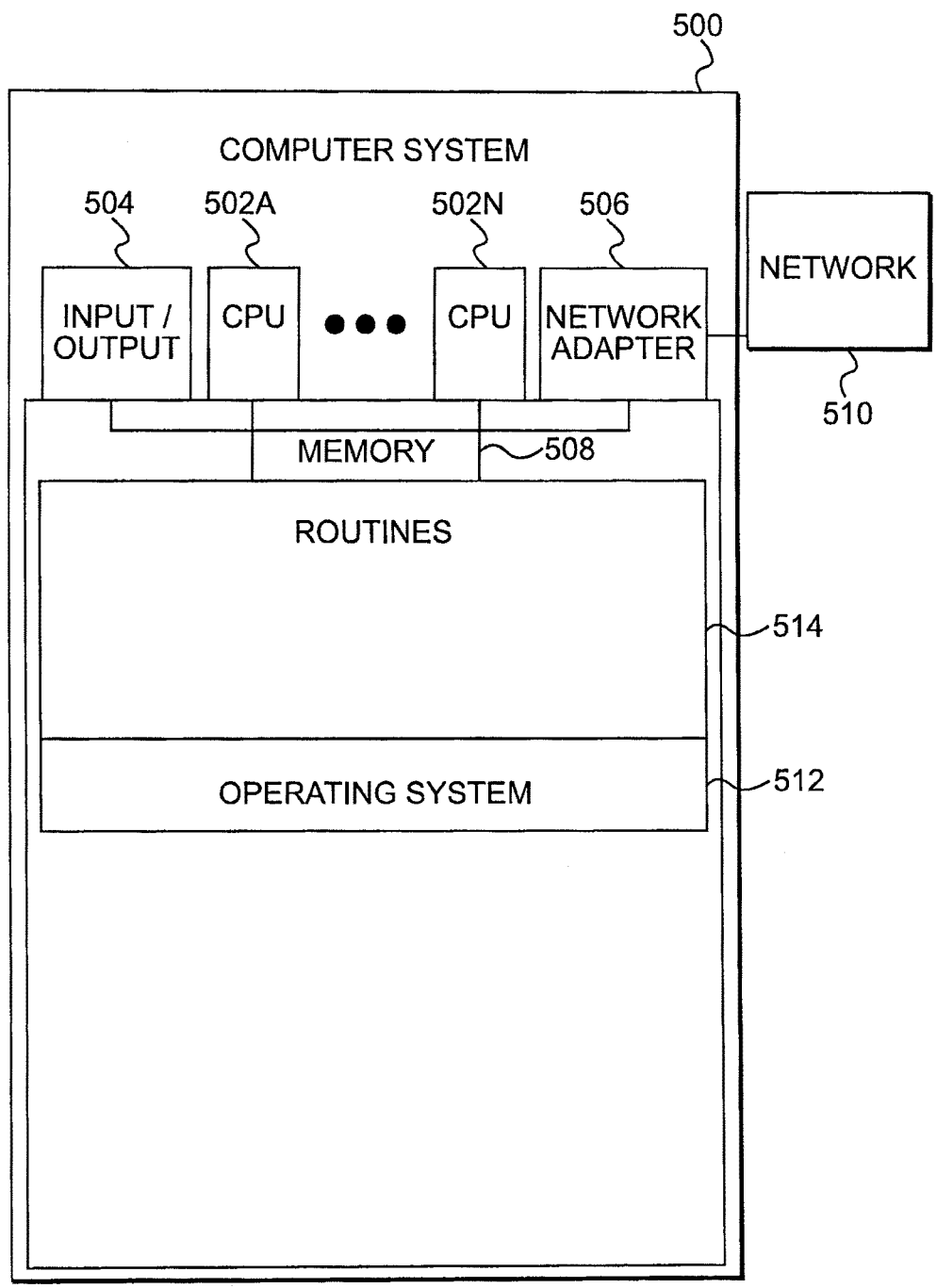
FIG. 5 is an exemplary block diagram of a computer system, such as a Server, according to an embodiment of the invention.

An exemplary block diagram of a computer system 500, such as Server 104 is shown in FIG. 5. System 500 is typically a programmed general-purpose computer system, such as a personal computer, workstation, server system, minicomputer or mainframe computer. System 500 includes one or more processors (CPUs) 502A-502N, input/output circuitry 504, network adapter 506, and memory 508. CPUs 502A-502N execute program instructions in order to carry out the functions of the present invention. Typically, CPUs 502A-502N are one or more microprocessors, such as an INTEL PENTIUM® processor. FIG. 5 illustrates an embodiment in which System 500 is implemented as a single multi-processor computer system, in which multiple processors 502A-502N share system resources, such as memory 508, input/output circuitry 504, and network adapter 506. However, the present invention also contemplates embodiments in which system 500 is implemented as a plurality of networked computer systems, which may be single-processor computer systems, multi-processor computer systems, or a mix thereof.

Input/output circuitry 504 provides the capability to input data to, or output data from, database/system 500. For example, input/output circuitry may include input devices, such as keyboards, mice, touchpads, trackballs, scanners, etc., output devices, such as video adapters, monitors, printers, etc., and input/output devices, such as, modems, etc. Network adapter 506 interfaces device 500 with network 510. Network 510 includes any communications network that is now in service or which may be developed in the future. Such a network may include one or more public or private communications networks, such as the Internet, wired or wireless telephone networks, wired or wireless data networks, local area networks, etc.

Memory 508 stores program instructions that are executed by, and data that are used and processed by, CPU 502 to perform the functions of system 500. Memory 508 may include electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc, or a fiber channel-arbitrated loop (FC-AL) interface, or Serial AT Attachment (SATA), or a variation or enhancement thereof.

The content of memory 508 varies depending upon the function that system 500 is programmed to perform. Operating system 512 provides overall system functionality. Routine 514 perform the functions necessary to provide the services of system 500.

As shown in FIG. 5, the present invention contemplates implementation on a system or systems that provide multi-processor, multi-tasking, multi-process, and/or multi-thread computing, as well as implementation on systems that provide only single processor, single thread computing.

Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including UNIX®, OS/2®, and Windows®, are capable of running many tasks at the same time and are called multitasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable storage media include, floppy disks, hard disk drives, CD-ROMs, DVDROMs, RAM, flash memory, etc.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of authenticating a subscriber of a service using a graphical user interface or telephone using the same user name and password comprising:

receiving, at a server, a user name and/or password, wherein the password is not encrypted, from a client device for a subscriber, wherein the same user name or password was entered with either a standard telephone keyboard layout or a graphical user interface, but representing the user name or password as a string of integers when the user name or password is entered with a standard telephone keyboard layout, and representing the user name or password as an alphanumeric string when the user name or password is entered with a graphical user interface, wherein, for at least some data values entered with the standard telephone keyboard layout, each data value entered with the standard telephone keyboard layout represents a plurality of data values entered with the graphical user interface, but each data value entered with the graphical user interface represents only one data value entered with the standard telephone keyboard layout;

determining automatically, at the server, whether the user name or password was entered using a standard telephone keyboard layout or a graphical user interface, based on a type of connection over which the user name or password was received at the server;

generating a signature for the received password at the server;

when the password was entered using a standard telephone keyboard layout, accessing a record for the subscriber and comparing the signature for the password entered using the standard telephone keyboard layout with a signature for the password in field of the accessed record;

when the password or user name was entered using a graphical user interface, accessing the record for the subscriber and comparing the signature for the alphanumeric string entered using the graphical user interface with the signature for the alphanumeric string for the user name or password in the field in the record storing the graphical user interface user name or password for the subscriber, wherein the same record for the subscriber is accessed when the user name or password was entered using a standard telephone keyboard layout and when the password or user name was entered using a graphical user interface;

notifying the subscriber of whether the password or username has been accepted.

2. The method according to claim 1, further comprising: establishing a connection with the client device.

3. The method according to claim 1, further comprising: providing a prompt to enter user name or password.

4. A server for authenticating a subscriber of a service using a graphical user interface or telephone using the same user name or password comprising a hardware processor operable to execute computer program instructions, a memory operable to store computer program instructions executable by the processor, and computer program instructions stored in the memory and executable to perform the steps of:

receiving, at the server, a user name and/or password, wherein the password is not encrypted, from a client device for a subscriber, wherein the same user name or password was entered with either a standard telephone keyboard layout or a graphical user interface, but representing the user name or password as a string of integers when the user name or password is entered with a standard telephone keyboard layout, and representing the user name or password as an alphanumeric string when the user name or password is entered with a graphical user interface, wherein, for at least some data values entered with the standard telephone keyboard layout, each data value entered with the standard telephone keyboard layout represents a plurality of data values entered with the graphical user interface, but each data value entered with the graphical user interface represents only one data value entered with the standard telephone keyboard layout;

determining automatically, at the server, whether the user name or password was entered using a standard telephone keyboard layout or a graphical user interface, based on a type of connection over which the user name or password was received at the server, generating a signature for the received password at the server;

when the password was entered using a standard telephone keyboard layout, accessing a record for the subscriber and comparing the signature for the password entered using the standard telephone keyboard layout with a signature of the password in field of the accessed record;

when the password or user name was entered using a graphical user interface, accessing the record for the subscriber and comparing the signature for the alphanumeric string entered using the graphical user interface with the signature for the alphanumeric string for the user name or password in the field in the record storing the graphical user interface user name or password for the subscriber, wherein the same record for the subscriber is accessed when the user name or password was entered using a standard telephone keyboard layout and when the password or user name was entered using a graphical user interface;

notifying the subscriber of whether the password or user name has been accepted.

5. The server according to claim 4, further comprising the step of:

establishing a connection with the client device.

6. The server according to claim 4, further comprising the step of:

providing a prompt to enter user name or password.

* * * * *